United States Patent [19]

Greber et al.

[11] Patent Number: 5,118,765
[45] Date of Patent: Jun. 2, 1992

[54] SOLUBLE AND/OR FUSIBLE POLYAMIDOIMIDE-POLYIMIDE BLOCK COPOLYMERS

[75] Inventors: Gerd Greber, Bad Vöslau; Heinrich Gruber; Wolfgang Wimmer, both of Vienna, all of Austria

[73] Assignee: Chemie Holding Aktiengesellschaft, Linz, Austria

[21] Appl. No.: 676,461

[22] Filed: Mar. 26, 1991

Related U.S. Application Data

[63] Continuation of Ser. No. 094,610, Sep. 9, 1987, abandoned.

[30] Foreign Application Priority Data

Sep. 19, 1986 [AT] Austria .................... 2514/86

[51] Int. Cl.⁵ .................... C08L 79/08
[52] U.S. Cl. .................... 525/432; 525/436; 525/907; 525/928
[58] Field of Search ............... 525/432, 436, 907, 928

[56] References Cited

U.S. PATENT DOCUMENTS

| | | | |
|---|---|---|---|
| 3,894,114 | 7/1975 | Lohmann et al. | 260/857 PH |
| 4,225,686 | 9/1980 | Onder et al. | 525/432 |
| 4,340,697 | 7/1982 | Aya et al. | 525/432 |
| 4,728,697 | 3/1988 | Bolon et al. | 525/424 |

FOREIGN PATENT DOCUMENTS

917844 12/1972 Canada .................... 525/436

OTHER PUBLICATIONS

Chem. Abst. 98, Col. 17225y (1983).
Chem. Abst. 100, Col. 69238j (1984).
Chem. Abst. 100, Col. 175555v (1984).
Chem. Abst. 104, Col. 130783j (1986).
Encyclopedia of Polymer Science and Technology, Supplement vol. 2, (1977), pp. 84–112.
Adduci, Journal of Applied Polymer Science, vol. 28, 2069–2081 (1983).
Kwiatkowski et al., Journal of Polymer Science, vol. 12, 589–601 (1974).

*Primary Examiner*—Ana L. Carrillo
*Attorney, Agent, or Firm*—Wenderoth, Lind & Ponack

[57] ABSTRACT

Soluble and/or fusible polyamidoimide-polyimide block copolymers with high heat stability, useful e.g. as molding powders for thermoplastic shaping films, fibers and laminates and process for their preparation are provided.

8 Claims, No Drawings

SOLUBLE AND/OR FUSIBLE POLYAMIDOIMIDE-POLYIMIDE BLOCK COPOLYMERS

This application is a continuation of now abandoned application Ser. No. 094,610, filed on Sep. 9, 1987.

The invention relates to soluble, fusible or both soluble and fusible heat-stable polyamidoimide-polyimide block copolymers (PAI-PI-BCP) and processes for their preparation.

Technically the most important heat-stable polymers to date are the entirely aromatic polyimides, which have extremely high heat stabilities but are neither fusible nor soluble and can therefore be processed only with great effort and expense (J. Appl. Pol. Sci. Vol. 28, 2069-2081 (1983)). The somewhat less heat-stable aromatic polyamides are also non-fusible and are insoluble or only sparingly soluble in most organic solvents, so that their processing from solution to fibers or films is associated with great difficulties (Encyclopedia of Polymer Science and Technology, Suppl. Volume 2 (1977) page 84-112). All attempts to develop heat-stable polymers which are fusible or have a better solubility—for example by modifying the chemical structure by incorporation of flexible chain elements ($-CH_2-$, $-O-$, $-S-$ or $-CO-$) or sterically demanding groups—have so far led to a usually considerable loss of heat stability. These polymers also include the technically important polyamidoimides and polyester-imides, in which aromatic amide and imide or ester and imide groups are arranged randomly and which usually have thermoplastic properties but also have a relatively low heat stability (J. Pol Sci., Polymer Chemistry Edition, Volume 12, 589-601 (1974)).

The actual solution to the problem in the field of heat-stable polymers thus still lies in the development of products with a higher heat stability and at the same time a good processability.

The object of the present invention was to develop novel heat-stable polymers which are soluble, fusible or both soluble and fusible and at the same time have a high heat stability, and are thus processable by conventional methods.

It has now been found that this object can be achieved with the aid of polyamidoimide-polyimide block copolymers in which the units are not arranged randomly but in block form.

The present invention accordingly relates to soluble, fusible or both soluble and fusible polyamidoimide-polyimide block copolymers of the general formula I on the sheet of formulae, wherein n represents an integer from 1 to 200, PAI represents a polyamidoimide block of the general formula II on the sheet of formulae and PI represents a polyimide block of the general formula III on the sheet of formulae, wherein x and y independently of one another denote an integer from 1 to 80, R denotes divalent aromatic radicals of the formulae IV to IX on the sheet of formulae or mixtures thereof, Ar denotes tri- or tetravalent aromatic radicals or mixtures thereof and m denotes an integer from 1 to 4.

Trivalent or tetravalent aromatic radicals Ar which are suitable according to the invention are all the known such radicals which are derived, in particular, from the corresponding tri- or tetracarboxylic acids or their derivatives, such as, for example, anhydrides, esters or acid chlorides. Examples of these are radicals of aromatics, fused aromatics, heteroaromatics and derivatives thereof. Preferred polyamidoimide-polyimide block copolymers of the general formula I on the sheet of formulae are those which contain a benzene or benzophenone radical as the tetravalent aromatic radical or a benzene radical as the trivalent aromatic radical.

The polyamidoimide-polyimide block copolymers according to the invention can be prepared by a) reacting aromatic tricarboxylic acids or reactive derivatives thereof with diamines of the general formula X on the sheet of formulae to give a polyamidoamido acid block of the general formula XI on the sheet of formulae, b) reacting aromatic tetracarboxylic acids or reactive derivatives thereof with diamines of the general formula X on the sheet of formulae to give a polyamido acid block of the general formula XII on the sheet of formulae, c) reacting the polyamidoamido acid blocks of the general formula XI on the sheet of formulae with the polyamido acid blocks of the general formula XII on the sheet of formulae with one another, preferably in a stoichiometric ratio, and subjecting the polyamidoamido acid-polyamido acid block copolymer initially formed to chemical or thermal cyclization, the symbols used in the general formulae X, XI and XII having the abovementioned meaning.

Polyamidoamido acid blocks with amino end groups of the general formula XI on the sheet of formulae, are preferably obtained by using, for example, trimellitic anhydride chloride as the aromatic tricarboxylic acid derivative and reacting this with excess diamine of the general formula X. The length of the blocks can be varied within wide limits in a simple manner by the given molar ratio of the reaction partners—i.e. by the excess of diamine. Apart from trimellitic anhydride chloride, methyl, ethyl or isopropyl trimellitate or trimellitic anhydride are also preferably employed for synthesis of the polyamidoamido acid blocks of the formula XI. In principle, however, other known tricarboxylic acid monoanhydrides or their organic and inorganic esters are also suitable for this reaction.

The polyamido acid blocks with anhydride end groups, of the general formula XII on the sheet of formulae, are preferably obtained by reacting a diamine of the general formula X on the sheet of formulae with benzophenonetetracarboxylic acid dianhydride in excess. The length of the blocks can likewise be varied by the given molar ratio of the reaction partners—i.e. by the excess of tetracarboxylic acid derivative. In addition to benzophenonetetracarboxylic dianhydride, pyromellitic dianhydride is preferably used for the synthesis of the polyamido acid blocks of the formula XII on the sheet of formulae. However, other tetracarboxylic acid dianhydrides known from the chemistry of heat-stable polymers can also be used according to the invention.

The polyamidoamido acid blocks of the formula XI on the sheet of formulae and the polyamido acid blocks of the formula XII on the sheet of formulae can be prepared in a manner which is known per se in strongly polar solvents, such as, for example, dimethylformamide (DMF), dimethylacetamide (DMA), N-methylpyrrolidone (NMP), dimethyl sulfoxide (DMSO), tetramethylurea or hexamethylphosphoric acid triamide. The reaction temperature can vary within a wide range depending on the starting substances used and the desired end product. If reactive anhydrides or anhydride chlorides are used, the temperatures are between $-30°$ and $+30°$ C. With the less reactive acids or acid esters, reaction temperatures up to 150° C. are required.

The blocks of the formulae XI and XII on the sheet of formulae preferably have average molecular weights of 1,000 to 20,000 and the intrinsic viscosities are preferably between 0.1 and 4.0 dl/g. The molecular weight sought for the blocks is checked by end group analysis after introduction of halogen—for example by reaction of the blocks XI with 4-chlorobenzaldehyde or reaction of the blocks XII with 4-bromoaniline—the expected values being confirmed. Both pure diamines of the formula X on the sheet of formulae and mixtures thereof in any desired composition can be used to prepare the blocks XI and XII, it thus being possible to prepare block copolymers which are soluble and fusible and have graded heat stabilities of between 420° and 490° C. and glass transition temperatures of about 210° to 300° C. Mixtures of tri- and tetracarboxylic acid derivatives of any desired composition can likewise be used to prepare the blocks XI and XII.

To synthesize the polyamidoamido acid-polyamido acid block copolymers, stoichiometric amounts of the polyamidoamido acid and polyamido acid blocks dissolved in the polar solvents mentioned are advantageously mixed and the mixture is stirred until the intrinsic viscosity has reached a maximum and the polyaddition has ended. As with all polyaddition reactions, the achievement of sufficient viscosities—that is to say molecular weights—depends on the exact stoichiometry of the reactive groups and thus on the degree of purity of the components used. The reaction temperatures are between $-30°$ and $+30°$ C., preferably 0° to 10° C. The concentration of the reaction partners is advantageously kept between 10 and 40%, the necessary mixing and cooling representing a limit to higher concentrations. The resulting solutions of the polyamidoamido acid-polyamido acid block copolymers can be converted into films and fibers in a known manner and can then be subjected to thermal cyclization with removal of water to give polyamidoimide-polyimide block copolymers, finally temperatures of up to 300° C. possibly being necessary for quantitative cyclization. In principle, such solutions can also be used for lamination, but the water split off may cause trouble, so that the great advantage of the block copolymers according to the invention of also being readily soluble in the cyclized form in polar solvents is advantageously utilized here.

On the other hand, if the block copolymers are to be isolated in powder form—for example as molding powders for thermoplastic shaping—the cyclization can be carried out chemically with the aid of water-absorbing agents, for example acetic anhydride, if appropriate in the presence of pyridine or other bases. The polyamidoimido-polyimide block copolymers can thus be either shaped thermoplastically under pressure or dissolved in polar solvents. Films, fibers and laminates can be produced from such solutions, the great advantage being that after the solvent has been removed, polyimide and polyamidoimide blocks which are already cyclized are present, i.e. no further water has to be split off, which is above all of great importance for lamination processes.

The heat stabilities of the polyamidoimide-polyimide block copolymers according to the invention are, depending on the composition, about 420° to 490° C., measured in air by thermogravimetric analysis (TGA) at a heating up rate of 10° C./minute (5% weight loss), the sulfur-containing products having the best values. The glass transition temperatures are between about 210° and 300° C. The block copolymers also have excellent mechanical properties (tensile strength about 100 MPa, E modulus about 1,500 to 3,800 MPa, elongation at break about 10%), are soluble in the cyclized form in the abovementioned polar solvents in concentrations of up to about 20% by weight and can be shaped thermoplastically under pressure.

The following abbreviations have been used in the examples and tables:

| | |
|---|---|
| PAAA | polyamidoamido acid block |
| PAA | polyamido acid block |
| BCP | block copolymer |
| TMACl | trimellitic anhydride chloride |
| $MW_{th}$ | theoretical molecular weight, calculated from the molar ratio used for the reaction partners |
| BTDA | benzophenonetetracarboxylic acid dianhydride |
| $v_i$ | intrinsic viscosity, measured at 25° C. at a concentration of 0.5% by weight in DMA |
| DMA | dimethylacetamide |
| MDA | 4,4-methylenedianiline |
| TDA | 2,4-toluylenediamine |
| SlDA | 4,4-diaminodiphenyl sulfide |
| S2DA | p-bis-(4-aminophenylthio)benzene |
| S4DA | p-bis-(p-(p-aminophenylthio)phenylthio)benzene |
| DS | 4,4-diaminodiphenyl sulfone |
| SSD | 1,4-bis(4-aminophenylthio)diphenyl sulfone |

EXAMPLE 1 a) Preparation of a polyamidoamido acid block with amino end groups (molecular weight 2,100):

6.5523 g (0.0330 mol) of MDA are dissolved in 50 ml of anhydrous DMA, and 5.7990 g (0.0275 mol) of TMACl are added in portions in solid form at $-15°$ to $-5°$ C., with stirring. After the mixture has been stirred at $-5°$ C. for one hour and at 20° to 25° C. for three hours, a solution of 3.8 ml (0.0275 mol) of triethylamine in 24 ml of anhydrous DMA is added dropwise at 5° to 10° C. and the mixture is stirred at 20 ° C. for one hour. The triethylamine hydrochloride is filtered off and washed with 15 ml of DMA. A solution of a PAAA with an intrinsic viscosity of 0.18 dl/g (0.5% by weight in DMA) is obtained.

b) Preparation of a polyamido acid block with anhydride end groups (molecular weigh: 2,140):

8.0000 g (0.0248 mol) of BTDA are suspended in 20 ml of anhydrous DMA. A solution of 1.9690 g (0.0099 mol) of MDA and 1.2132 g (0.0099 mol) of TDA in 18 ml of anhydrous DMA is then added dropwise at 5°-20° C., with stirring, the BTDA slowly dissolving. A solution of a PAA with an intrinsic viscosity of 0.14 dl/g (0.5% by weight in DMA) is obtained.

c) Preparation of a polyamidoamido acid-polyamido acid block copolymer:

The solution of the polyamidoamido acid with amino end groups obtained according to Example 1a is added dropwise to the solution of the polyamido acid with anhydride end groups obtained according to Example 1b at 5°-10° C. in the course of 10 minutes, under nitrogen After the mixture has been stirred at 20°-25° C. for 2 hours, a solution of the polyamidoamido acid-polyamido acid block copolymer is obtained.

d) Production of a film from a polyamidoimide-polyimide block copolymer:

If the concentration is increased to about 30% by weight in the preparation of the block copolymer (cf. Example 1c), the resulting polymer solution can be used directly for production of film. For this, the polymer solution is applied to a glass plate with the aid of a film-drawing unit (brass doctor blade with a slit height of 0.8 mm) and heated slowly from 50° C. to 230° C. under 20 mm Hg in the course of 24 hours, quantitative cyclization taking place, as can be seen from the IR spectrum of the film.

e) Preparation of a molding powder from a polyamidoamido acid-polyamido acid block copolymer:

To prepare a molding powder, about 10 g of the polymer solution of a block copolymer (cf. Example 1c) are added dropwise to 30 ml of a mixture of 3 parts by volume of pyridine and 2 parts by volume of acetic anhydride and the mixture is then stirred at about 25° C. for 20 hours. A yellow gelatinous suspension is formed. This is added dropwise, for example, to a mixture of one part by volume each of water and methanol and the resulting suspension is homogenized as far as possible with a "Turrax" mixer. The resulting yellow powder is filtered off with suction and washed thoroughly with methanol. The product is then dried to constant weight at 130° C. in a vacuum drying cabinet for 16 hours.

Examples 2 to 24:

The polyamidoamido acid blocks, polyamido acid blocks, polyamidoamido acid-polyamido acid block copolymers and foils or molding powders of polyamidoimide-polyimide block copolymers shown in Table 1 are obtained by working instructions analogous to those given in Example 1a to e.

TABLE 1

| Example | PAAA BLOCK WITH AMINO END GROUPS | | PAA BLOCK WITH ANHYDRIDE END GROUPS | | PAAA PAA-BCP $v_i$ (dl/g) | PAI-PI-BCP No. |
|---|---|---|---|---|---|---|
| | TMACl is reacted with an excess of | $MW_{th}$ | BTDA is reacted with a sub-stoichiometric amount of | $MW_{th}$ | | |
| 1 | MDA | 2100 | MDA(1) + TDA(1) | 2300 | 0.53 | I |
| 2 | MDA | 9900 | MDA(1) + TDA(1) | 2300 | 0.78 | II |
| 3 | MDA | 2100 | TDA | 2100 | 0.60 | III |
| 4 | MDA | 9900 | TDA | 2100 | 0.55 | IV |
| 5 | MDA | 15100 | MDA | 2100 | 0.65 | V |
| 6 | MDA | 2100 | TDA(4) + S1DA(1) | 2200 | 0.43 | VI |
| 7 | MDA | 2100 | TDA(1) + S1DA(4) | 2400 | 0.80 | VII |
| 8 | MDA | 2100 | MDA(1) + S1DA(4) | 2500 | 0.52 | VIII |
| 9 | S1DA | 2200 | TDA(4) + MDA(1) | 2200 | 0.65 | IX |
| 10 | S1DA | 2200 | TDA(1) + MDA(4) | 2300 | 0.56 | X |
| 11 | S1DA | 2200 | S1DA | 2500 | 0.37 | XI |
| 12 | MDA | 2100 | TDA(1) + S2DA(1) | 2300 | 0.54 | XII |
| 13 | MDA | 2100 | TDA(1) + S2DA(4) | 2800 | 0.62 | XIII |
| 14 | MDA | 2100 | MDA(1) + S2DA(4) | 2800 | 0.47 | XIV |
| 15 | S2DA | 2800 | TDA(4) + MDA(1) | 2200 | 0.46 | XV |
| 16 | MDA | 2100 | TDA(4) + S4DA(1) | 2400 | 0.51 | XVI |
| 17 | MDA | 2100 | TDA(1) + S4DA(4) | 3400 | 0.71 | XVII |
| 18 | MDA | 2100 | MDA(1) + S4DA(4) | 3500 | 0.42 | XVIII |
| 19 | MDA | 2100 | MDA(1) + DS(4) | 2560 | 0.38 | XIX |
| 20 | MDA | 2100 | TDA(1) + DS(4) | 2500 | 0.27 | XX |
| 21 | MDA | 2100 | TDA(4) + DS(1) | 2200 | 0.38 | XXI |
| 22 | MDA | 2100 | TDA(1) + SSD(4) | 3200 | 0.26 | XXII |
| 23 | DS | 2360 | TDA(1) + MDA(4) | 2160 | 0.27 | XXIII |
| 24 | SSD | 3660 | TDA(4) + MDA(1) | 2160 | 0.34 | XXIV |

TABLE 2

| | Thermal and mechanical properties of the PAI-PI-BCP | | | | | | |
|---|---|---|---|---|---|---|---|
| No. | DIAMINE IN THE PAAA BLOCK | DIAMINE IN THE PAA BLOCK | $T_G$ (°C.) | TGA (°C.) | Tensile strength (MPa) | E modulus (MPa) | Elongation at break (%) |
| I | MDA | MDA(1) + TDA(1) | 245 | 460 | 124 ± 8 | 2625 | 9 ± 3 |
| II | MDA | MDA(1) + TDA(1) | 270 | 440 | 107 ± 9 | 2786 | 8 ± 4 |
| III | MDA | TDA | 245 | 460 | 131 ± 12 | 3257 | 9 ± 1 |
| IV | MDA | TDA | 250 | 440 | 87 ± 19 | 3005 | 6 ± 3 |
| V | MDA | MDA | 250 | 430 | 98 ± 17 | 2737 | 5 ± 2 |
| VI | MDA | TDA(4) + S1DA(1) | | | 95 | 3000 | 10 |
| VII | MDA | TDA(1) + S1DA(4) | 280 ± 5 | 460 ± 5 | | 3800 | |
| VIII | MDA | MDA(1) + S1DA(4) | | | | 3200 | |
| IX | S1DA | TDA(4) + MDA(1) | | | 105 ± 5 | 3800 | 6 ± 2 |
| X | S1DA | TDA(1) + MDA(4) | 275 | 475 | | 3400 | |
| XI | S1DA | S1DA | | 470 | | 1500 | 18 ± 4 |
| XII | MDA | TDA(4) + S2DA(1) | 290 | 450 | | 2700 | |
| XIII | MDA | TDA(1) + S2DA(4) | | 485 | 105 ± 5 | 2200 | 10 ± 2 |
| XIV | MDA | MDA(1) + S2DA(4) | 260 ± 5 | 475 | | 3700 | |
| XV | S2DA | TDA(4) + MDA(1) | | | | 2900 | 7 |
| XVI | MDA | TDA(4) + S4DA(1) | 270 | 480 | 115 | 2400 | |
| XVII | MDA | TDA(1) + S4DA(4) | 230 | | 95 | 2500 | 7 ± 2 |
| XVIII | MDA | MDA(1) + S4DA(4) | 210 | 490 | 100 | 2900 | |
| XIX | MDA | MDA(1) + DS(4) | 277 | 447 | 100 ± 1 | 2666 | 8 ± 1 |
| XX | MDA | MDA(1) + DS(4) | 267 | 461 | 104 ± 3 | 3118 | 6 ± 1 |
| XXI | MDA | TDA(4) + DS(1) | 289 | 468 | 88 ± 9 | 1836 | 6 ± 1 |
| XXII | MDA | TDA(1) + SSD(4) | 282 | 437 | 88 ± 3 | 2871 | 4 ± 1 |
| XXIII | DS | TDA(1) + MDA(4) | 282 | 447 | 89 ± 21 | 3169 | 6 ± 1 |
| XXIV | SSD | TDA(4) + MDA(1) | 271 | 425 | 90 ± 6 | 2465 | 5 ± 1 |

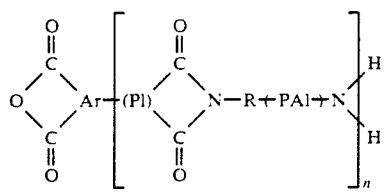

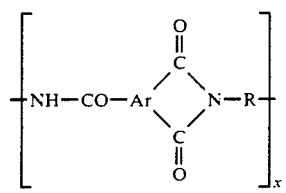

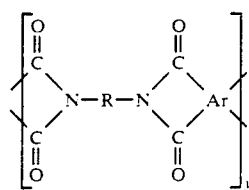

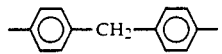

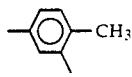

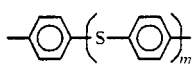

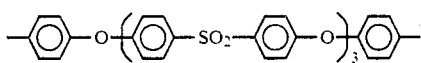

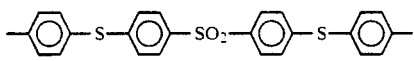

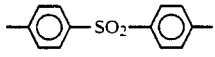

H₂N—R—NH₂

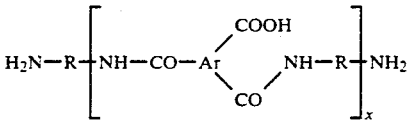

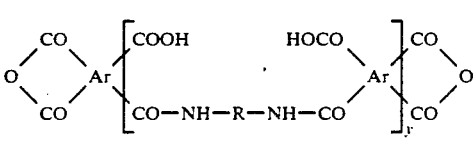

We claim:
1. A polyamidoimide-polyimide block copolymer of the formula:

I

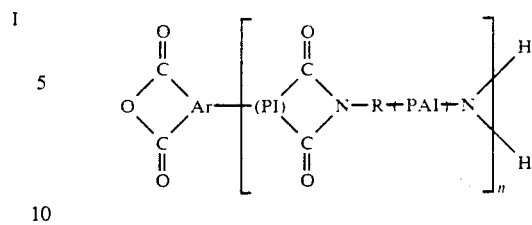

wherein n represents an integer from 1 to 20, PAI represents a polyamidoimide block of the formula

II

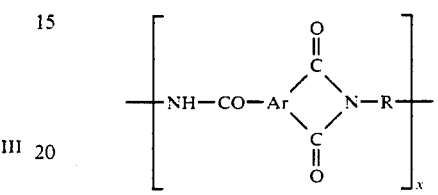

and PI represents a polyimide block of the formula:

III

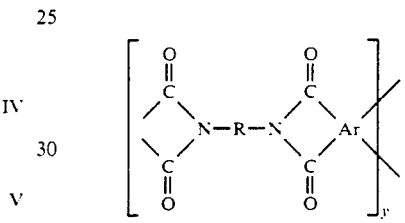

wherein x and y independently of one another denote an integer from 1 to 80, R denotes divalent aromatic radicals of the formulae:

IV 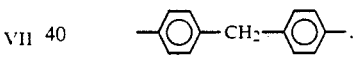

V 

VI 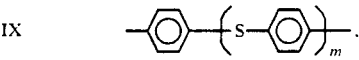

VII 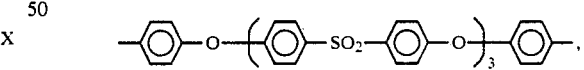

VIII 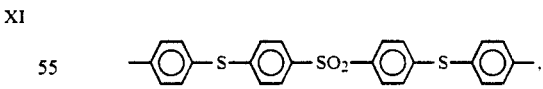

IX

X

XI or

XII 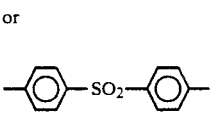

or mixtures thereof. Ar denotes tri- or tetravalent aromatic radicals or mixtures thereof and m denotes an integer from 1 to 4.

2. The polyamidoimide-polyimide block copolymer as claimed in claim 1, wherein the tetravalent aromatic radicals represent benzophenone radicals.

3. The polyamidoimide-polyimide block copolymer as claimed in claim 1, wherein the trivalent aromatic radicals represent benzene radicals.

4. A process for the preparation of a polyamidoimide-polyimide block copolymer of the formula:

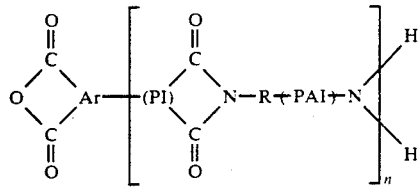

wherein n represents an integer from 1 to 200, PAI represents a polyamidoimide block of the formula:

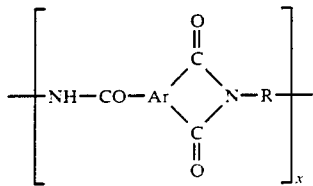

and PIP represents a polyimide block of the formula:

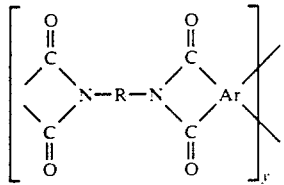

wherein x and y independently of one another denote an integer from 1 to 80, R denotes divalent aromatic radicals of the formulae:

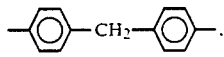

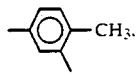

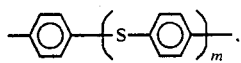

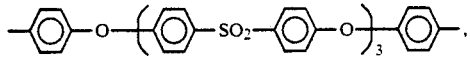

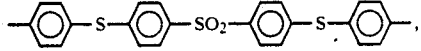

or

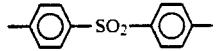

or mixtures thereof, Ar denotes tri- or tetravalent aromatic radicals or mixtures thereof and m denotes an integer from 1 to 4, which comprises a) reacting an aromatic tricarboxylic acid or reactive derivative thereof with a diamine of the formula:

to give a polyamidoamido acid block of the formula:

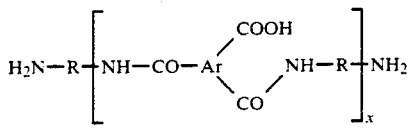

b) reacting an aromatic tetracarboxylic acid or reactive derivative thereof with a diamine of the formula:

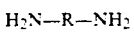

to give a polyamido acid block of the formula:

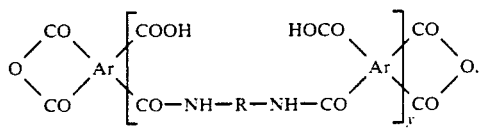

c) reacting the polyamidoamido acid block of the formula:

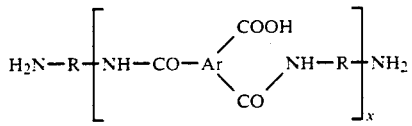

and the polyamido acid block of the formula:

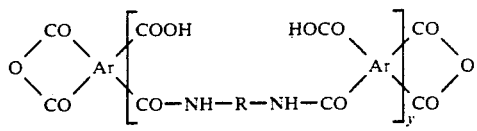

with one another and subjecting the polyamidoamido acid-polyamido acid block copolymer initially formed to chemical or thermal cyclization.

5. The process as claimed in claim 4, wherein benzophenonetetracarboxylic acid dianhydride is used as the tetracarboxylic acid derivative.

6. The process as claimed in claim 4, wherein trimellitic anhydride chloride is used as the tricarboxylic acid derivative.

7. The process as claimed in claim 4, wherein a mixture of tetra- and tricarboxylic acid derivatives of any desired composition is used.

8. The process as claimed in claim 4, wherein a mixture of diamines of any desired composition is used.

* * * * *